United States Patent [19]
Shirakawa et al.

[11] Patent Number: 5,629,847
[45] Date of Patent: May 13, 1997

[54] CONTROL SYSTEM FOR VEHICLE SAFETY DEVICES

[75] Inventors: Shu Shirakawa; Hideki Yoshino, both of Tomioka, Japan

[73] Assignee: Airbag Systems Co., Ltd., Japan

[21] Appl. No.: 361,506

[22] Filed: Dec. 22, 1994

[30] Foreign Application Priority Data

Dec. 27, 1993 [JP] Japan ................... 5-347022

[51] Int. Cl.$^6$ .................................................. B60R 21/32
[52] U.S. Cl. .................. 364/424.055; 340/436; 280/735; 180/282; 307/10.1
[58] Field of Search .............. 364/424.05; 340/436, 340/438, 669; 307/10.1; 180/274, 282; 280/734, 735

[56] References Cited

U.S. PATENT DOCUMENTS

| | | | |
|---|---|---|---|
| 4,985,835 | 1/1991 | Sterler et al. | 280/735 |
| 5,339,242 | 8/1994 | Reid et al. | 280/735 |
| 5,363,302 | 11/1994 | Allen et al. | 180/282 |
| 5,365,114 | 11/1994 | Tsurushima et al. | 280/734 |
| 5,394,328 | 2/1995 | Huang | 180/282 |
| 5,445,413 | 8/1995 | Rudolf et al. | 280/735 |
| 5,483,449 | 1/1996 | Caruso et al. | 280/735 |
| 5,490,067 | 2/1996 | Teguri et al. | 280/735 |

FOREIGN PATENT DOCUMENTS 5-278559  10/1993  Japan .

*Primary Examiner*—Gary Chin
*Attorney, Agent, or Firm*—Pollock, Vande Sande & Priddy

[57] ABSTRACT

A control system for controlling the vehicle safety devices comprises first means for calculating from an acceleration signal produced by an acceleration sensor a first evaluation value related to vehicle speed change, second means for calculating from the acceleration signal a second evaluation value related to passenger position change, third means for squaring the acceleration signal and calculating from the squared value a third evaluation value related to the collision energy magnitude, operation control means for starting and stopping the calculations in the first to third means in response to the acceleration signal, and decision means for deciding whether or not to activate the vehicle safety devices in response to the first to third evaluation values. The control system can quickly and accurately discriminate and respond to collisions irrespective of type.

19 Claims, 11 Drawing Sheets

CONTROL SYSTEM FOR VEHICLE SAFETY DEVICES

BACKGROUND OF THE INVENTION

1. Field of the Invention

This invention relates to a control system for vehicle safety devices, more particularly to a control system for operating air bags, seat belt tensioners and other vehicle safety devices at the time of a collision.

2. Prior Art

Vehicle safety systems for protecting passengers from impacts arising during collisions are in wide use. These systems consist of one or more air bags, seat belt tensioners and/or other types of safety devices which are activated in response to the detection of a collision. The prior art systems of this type are controlled by, for example, integrating the vehicle acceleration detected by an acceleration sensor, using the integrated value for discriminating the rapid deceleration occurring at the time of collision, and activating the safety device(s) when the rapid deceleration of the vehicle reaches a prescribed level.

Since a vehicle with a crushable structure absorbs the impact at the beginning of a collision, however, the output level of the acceleration sensor installed in the vehicle may, depending on the nature of the collision, exhibit characteristics resembling those during the deformation occurring immediately after a low-speed collision. In such cases, the system cannot ascertain that a collision has occurred in response to the low-level output of the sensor immediately after the occurrence of a collision and only after the sensor output has reached a high level owing to the ensuing sharp increase in deceleration does the system issue a collision decision and activate the safety device(s). Therefore, since the prior art system activates the safety device(s) only after the speed value calculated from the acceleration data has reached a prescribed threshold value, it is extremely difficult for it to restrain the change in the head position of the passenger(s) to within the maximum range of head position change required for ensuring passenger safety.

Japanese Patent Application Public Disclosure No. Hei 5-278559 teaches a system for eliminating this problem in which a basic threshold value related to the vehicle speed at the time of collision is modified by a correction value related to vehicle speed for calculating a collision discrimination threshold value and this threshold value is compared with a speed value serving as a collision level estimation value for discriminating collision. This system prevents erroneous discrimination at low speeds by setting a relatively high threshold level and enables earlier collision discrimination at high speeds by holding the threshold value to a relatively low level.

Since the prior art system disclosed in this earlier patent application discriminates collisions by comparing a collision discrimination threshold value corrected for speed with a speed value constituting a collision level estimation value, it is able to prevent erroneous discrimination when the vehicle is being driven at low speed. On the other hand, however, it tends to delay the discrimination of collision occurrence. While it does enable earlier collision discrimination during high speed driving, the extent to which this is achieved is limited to within the range in which erroneous discrimination can be avoided.

SUMMARY OF THE INVENTION

One object of the present invention is therefore to provide a control system for vehicle safety devices which eliminates the aforesaid drawbacks of the prior art vehicle safety systems.

Another object of the present invention is to provide a control system for vehicle safety devices which can rapidly and reliably discriminate collisions of various types.

For achieving these objects the invention provides a control system for controlling the activation of a vehicle safety device in response to an acceleration signal from a detecting means for detecting vehicle acceleration, the system comprising first means for calculating from the acceleration signal a first evaluation value related to vehicle speed change, second means for calculating from the acceleration signal a second evaluation value related to passenger position change, third means for squaring the acceleration signal and calculating from the squared value a third evaluation value related to collision energy magnitude, operation control means for starting and stopping the calculations in the first to third means in response to the acceleration signal, and decision means for deciding whether or not to activate the vehicle safety devices in response to the first to third evaluation values calculated under the control of the operation control means.

When the operation control means detects that a prescribed condition has been met, e.g. that the vehicle acceleration has exceeded a prescribed value, it causes the first to third means to carry out prescribed calculations for obtaining the first to third evaluation values. On receiving the calculated values, the decision means decides whether or not to activate the safety device, namely, whether or not a collision has occurred, by comprehensively taking into account the vehicle speed change, the passenger position change and the magnitude of the collision energy determined based on whether or not the square-law characteristics of a collision signal obtained based on the value of the square of the acceleration signal exceeds a prescribed value within a prescribed surveillance period.

This invention will be better understood and other objects and advantages thereof will be more apparent from the following detailed description of preferred embodiments with reference to the accompanying drawings.

DETAILED DESCRIPTION OF THE PREFERRED EMBODIMENTS

Figure 1:
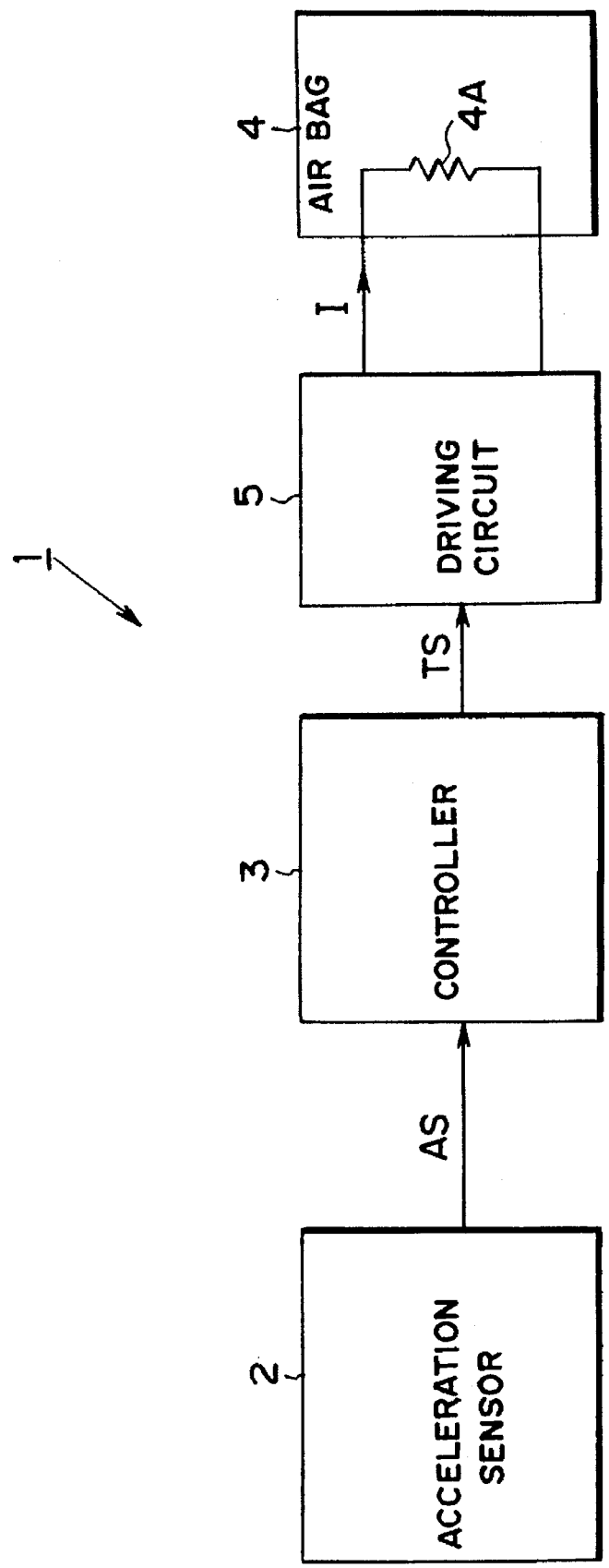
FIG. 1 is a block diagram of a vehicle safety system equipped with and embodiment of a controller according to this invention.

The vehicle control system 1 shown in FIG. 1 includes an acceleration sensor 2 which is mounted in the vehicle (not shown) and outputs an acceleration signal AS indicating the vehicle acceleration to a controller 3 constituted according to this invention. Based on the acceleration signal AS, the controller 3 decides whether or not the vehicle has become involved in a collision, and when it decides that a collision has occurred, it outputs a trigger signal TS for activating the safety devices installed in the vehicle. In the illustrated case showing only a single air bag 4 installed in the vehicle as a safety device, the trigger signal TS is input to a conventional driving circuit 5 for supplying ignition current to a squib 4A of the air bag 4. The prescribed ignition current I supplied to the squib 4A by the driving circuit 5 upon receipt of the trigger signal TS causes the air bag 4 to inflate.

Figure 2:
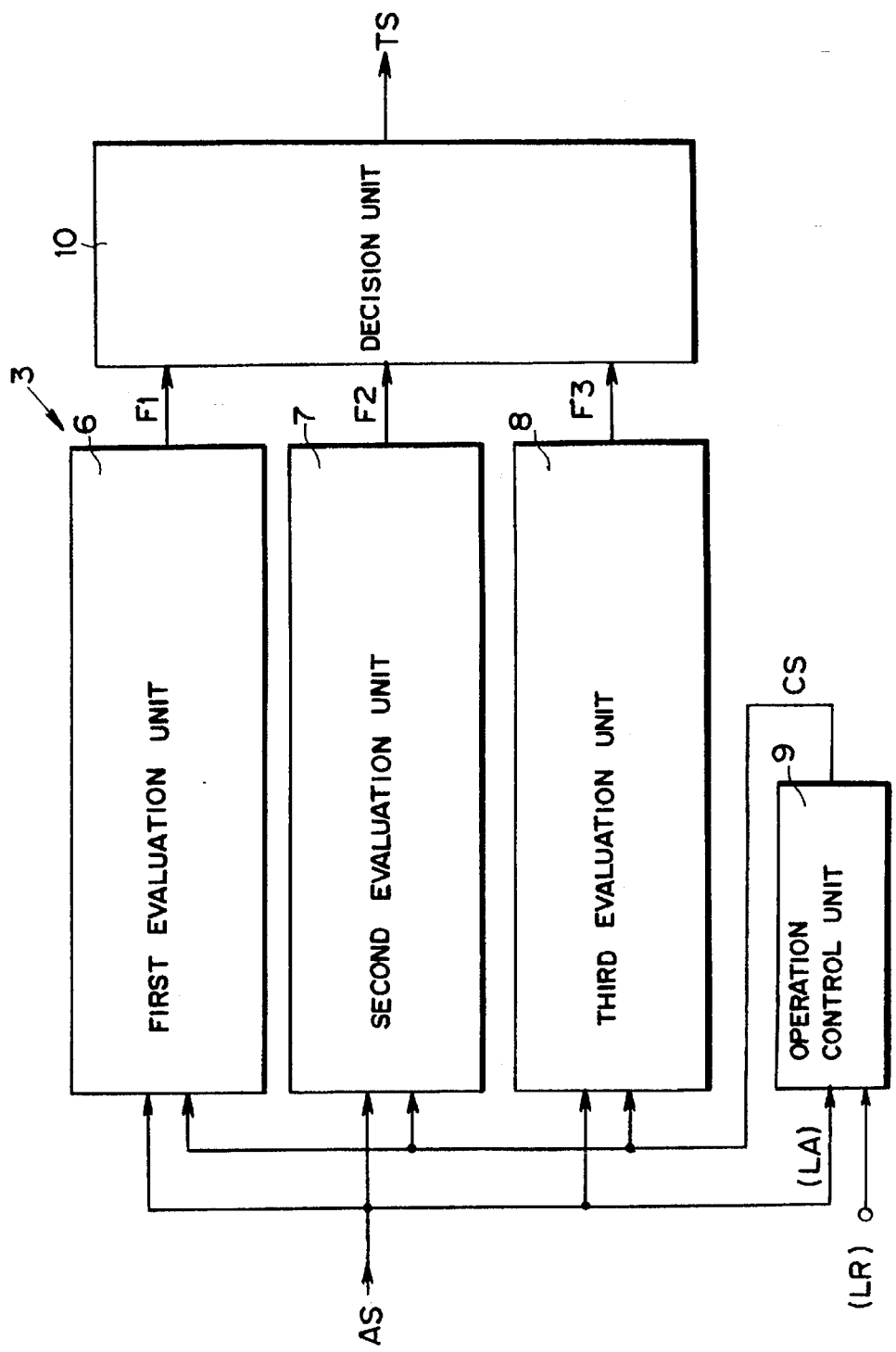
FIG. 2 is a block diagram of the controller shown in FIG. 1.

FIG. 2 is a block diagram showing the configuration of the controller 3. The controller 3 has a first evaluation unit 6 responsive to the acceleration signal AS for calculating and outputting a first evaluation signal F1 indicating vehicle speed change, a second evaluation unit 7 responsive to the acceleration signal AS for calculating and outputting a second evaluation signal F2 indicating the amount of position change, particularly the amount of head position change, of the vehicle passenger to be protected, and a third evaluation unit 8 responsive to the acceleration signal AS for calculating a third evaluation signal F3 which is determined based on the square of the acceleration value indicated by the acceleration signal AS and indicates the collision energy.

Reference numeral 9 in FIG. 2 designates an operation control unit responsive to the acceleration signal AS for deciding the times at which the calculations in the first to third evaluation units 6, 7, 8 are to be started and stopped and the calculated values are to be reset and for supplying an operation control signal CS indicating these times to the evaluation units 6, 7, 8. In the present embodiment, the operation control unit 9 compares the level LA of the acceleration signal AS with a reference level LR, decides that the instant when the level LA exceeds the reference level LR is the start of a collision, and simultaneously outputs a command to start calculation. Further, when the operation control unit 9 finds that the level LA of the acceleration signal AS has returned to the reference level LR, it decides that the collision has subsided and, based on this decision, outputs a command to stop calculation and resets the integrated values obtained in the evaluation units 6, 7, 8 to zero.

Figure 3:
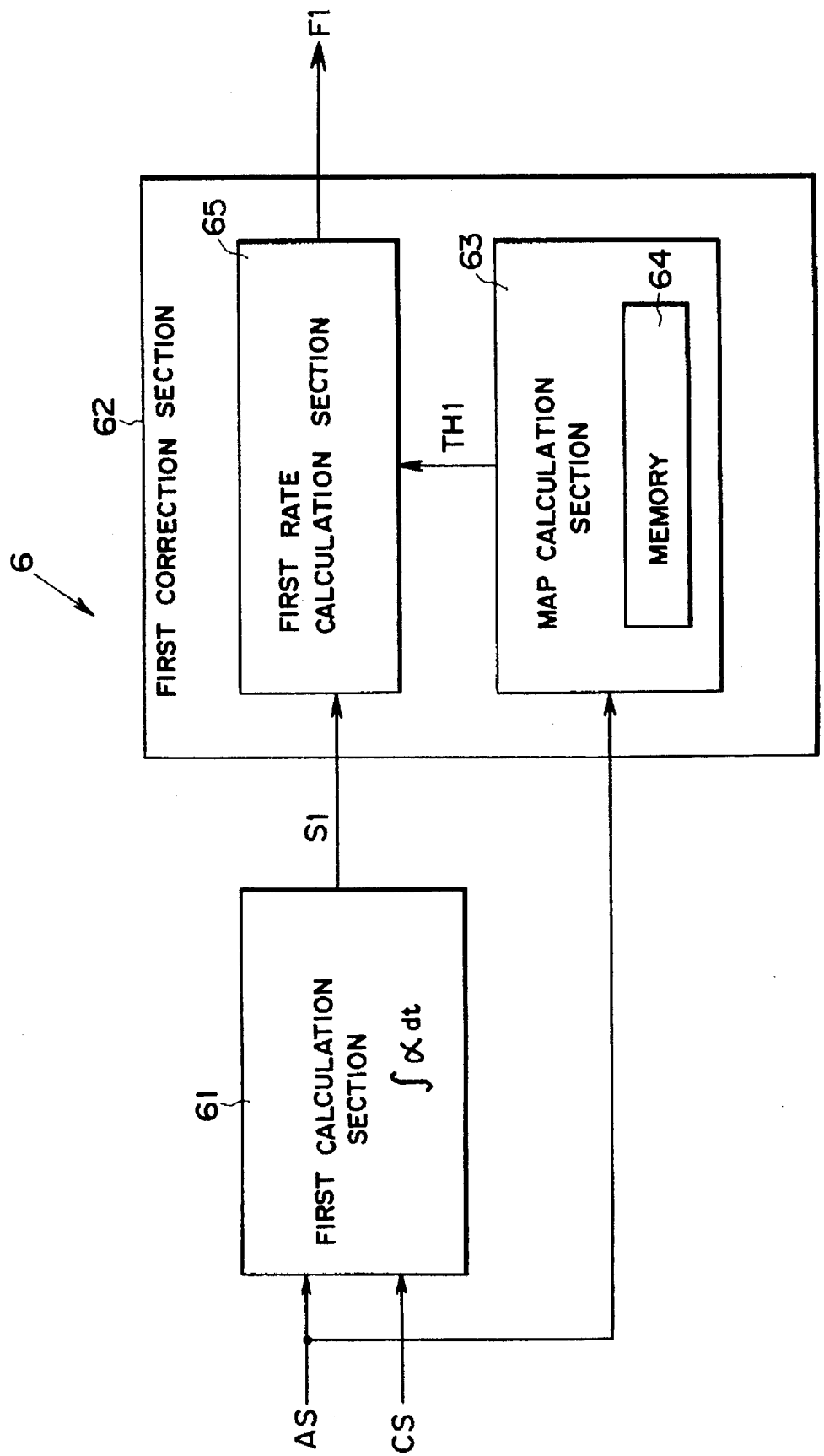
FIG. 3 a block diagram of the first evaluation unit shown in FIG. 2.

The first evaluation unit 6 will now be explained with reference to FIG. 3. The first evaluation unit 6 comprises a first calculation section 61 which receives the acceleration signal AS and which, upon receiving a calculation start command via the operation control signal CS, immediately begins to integrate the acceleration value α indicated by the acceleration signal AS at that time. The first evaluation unit 6 sends a first output S1 indicating the result of the calculation to a first correction section 62, which also receives the acceleration signal AS.

The first correction section 62 comprises a map calculation section 63 having a map memory 64 which stores mapped data for determining a threshold value for the first output S1, namely, for the vehicle acceleration value a corresponding to the first output S1. The mapped data corresponds to the basic threshold curve shown in FIG. 6. The map calculation section 63 carries out a map calculation for determining a threshold value V which changes from instant to instant in response to the acceleration signal AS. A first threshold signal TH1 indicating the threshold value V determined in this manner is sent to a first rate calculation section 65 which also receives the first output S1. The first rate calculation section 65 calculates S1/V. The first evaluation signal F1 output by the first evaluation unit 6 represents the result of this calculation. As is clear from the foregoing, the first evaluation signal F1 indicates the ratio of the actual vehicle speed to the 5 threshold value to be used at that speed. The more the value of first evaluation signal F1 exceeds unity, the stronger is the need for ignition (air bag activation).

Figure 6:
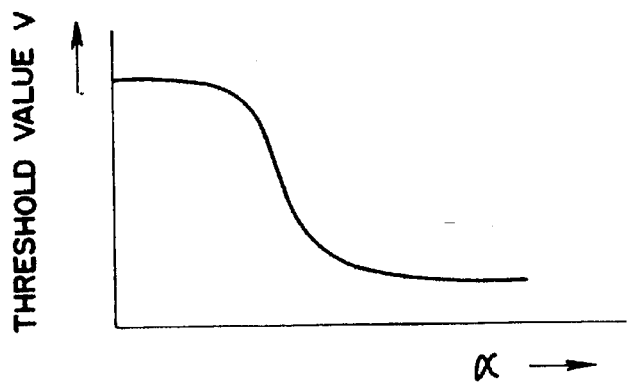
FIG. 6 is a characteristic curve of the correction in the first evaluation unit shown in FIG. 3.

For obtaining an optimum threshold curve for the deformation characteristics of the vehicle body concerned, the characteristic curve of FIG. 6 can be modified so as to match the results obtained in actual collision tests with the values of the first evaluation signal F1.

Figure 4:
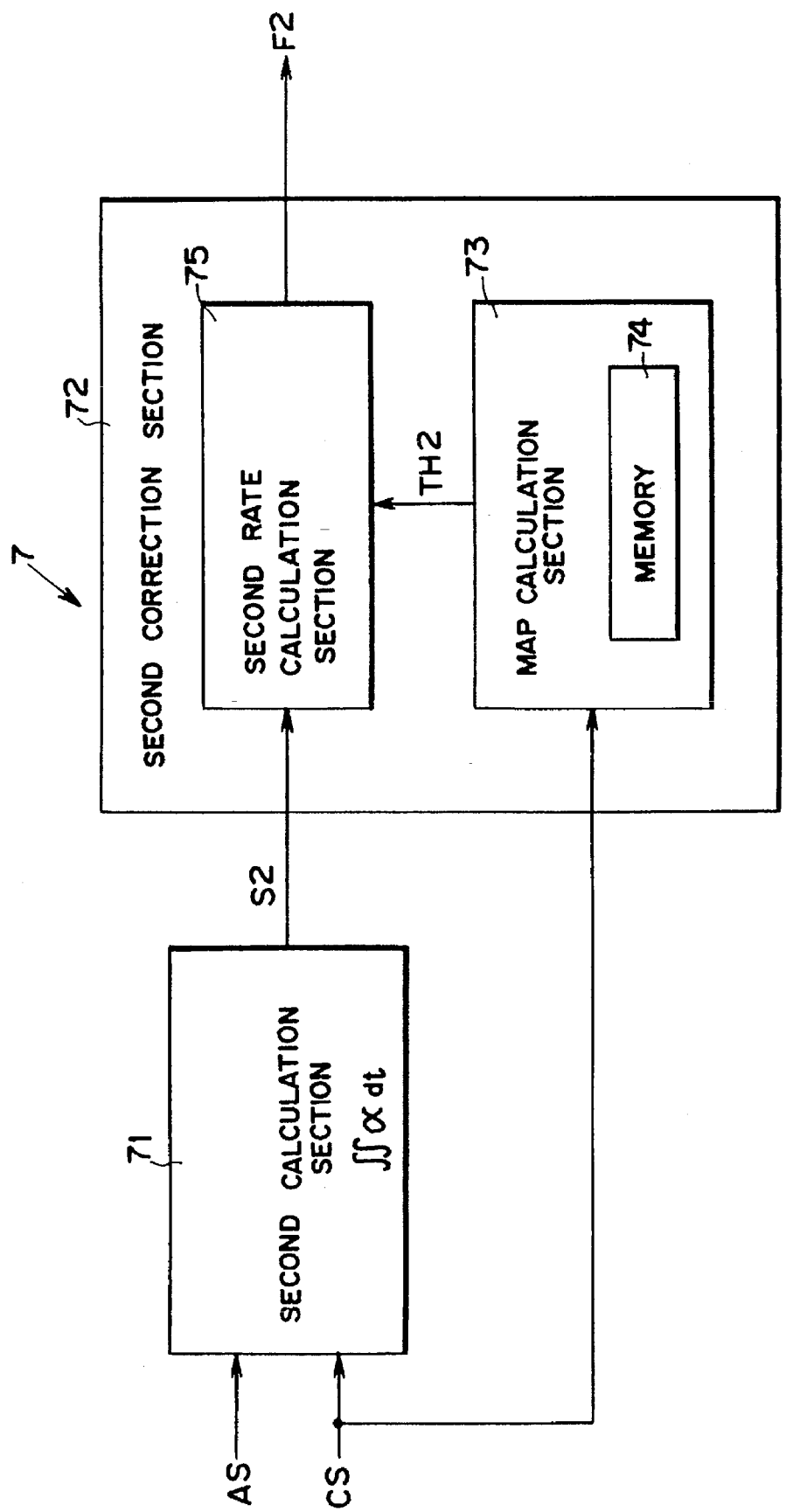
FIG. 4 a block diagram of the second evaluation unit shown in FIG. 2.

As shown in FIG. 4, the second evaluation unit 7 comprises a second calculation section 71 which receives the acceleration signal AS and the operation control signal CS. In response to a calculate start command via the operation control signal CS, the second calculation section 71 twice integrates the acceleration α indicated by the acceleration signal AS at that time and outputs the result as a second output S2 indicating a value related to passenger position change. The second output S2 is sent to a second correction section 72 which uses the second output S2 for deciding an evaluation value as a function of the time t elapsed from the start of the integration processing. The second evaluation signal F2 output by the second evaluation unit 7 represents this evaluation value.

Figure 7:
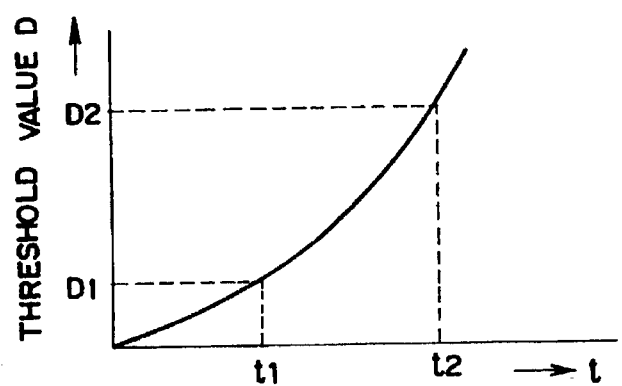
FIG. 7 is a characteristic curve of the correction in the second evaluation unit shown in FIG. 4.

FIG. 7 is the characteristic curve of a threshold value D for the second output S2. This curve, which is used for deciding the second evaluation signal F2, is plotted against the time t elapsed from the start of second output S2 integration represented on the horizontal axis and the passenger head position change at each instant during the elapsed time represented on the vertical axis. This characteristic curve shows how the amount of change in passenger head position varies with time under a continuous vehicle acceleration of prescribed magnitude. As shown by way of example, the amount of head position change at t=t1 is D1 and that at t=t2 is D2.

The second correction section 72 comprises a map calculation section 73 having a memory 74 for storing mapped data corresponding to the characteristic curve of FIG. 7. In response to the operation control signal CS, the map calculation section 73 carries out a map calculation for determining the threshold value D for the second output S2 at each instant of the elapsed time and outputs the result as a second threshold signal TH2. The position change amount indicated by the second threshold signal TH2 is the limit value of the head position change amount up to which the safety of the passenger can be ensured at the time concerned. A calculated actual position change amount exceeding this threshold value is indicative of a dangerous state at the instant concerned. For generating a signal indicating the degree of the danger, the second threshold signal TH2 and the second output S2 are sent to a second rate calculation section 75 which calculates the value S2/D. The second evaluation signal F2 output by the second evaluation unit 7 represents the result of this calculation. The more the value of the second evaluation signal F2 exceeds unity, the stronger is the need for ignition.

Figure 5:
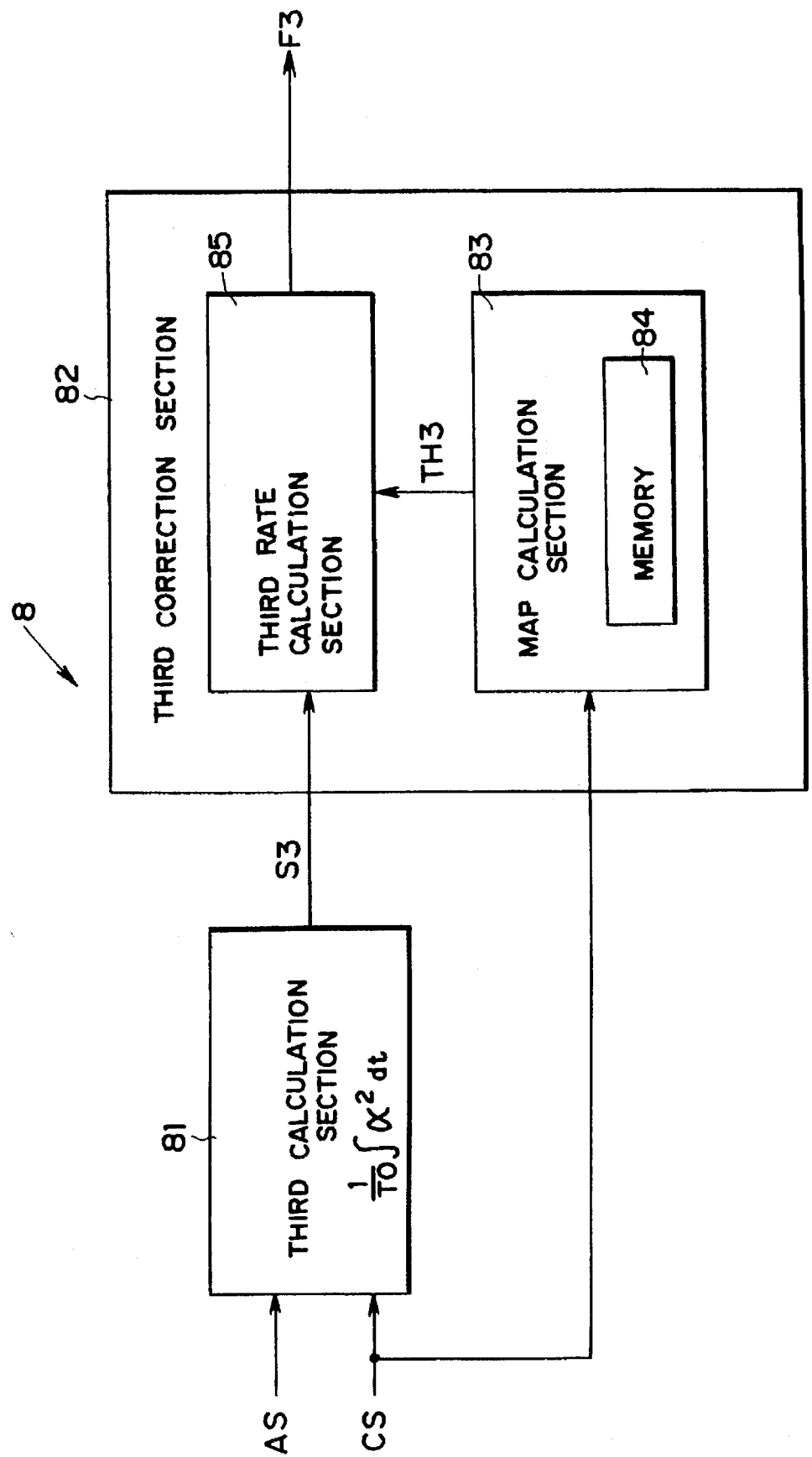
FIG. 5 a block diagram of the third evaluation unit shown in FIG. 2.

As shown in FIG. 5, the third evaluation unit 8 comprises a third calculation section 81 responsive to the acceleration signal AS for integrating the square of the acceleration α indicated by the acceleration signal AS and responsive to a calculation start command received via the operation control signal CS for starting a calculation for dividing the integration result by time T0. A third output S3 indicating the result of the calculation in the third calculation section 81 is sent to a third correction section 82. Time T0 is the collision state duration in the case where the vehicle concerned collides with a concrete barrier at the no-inflation limit speed (the maximum speed up to which the air bag does not inflate). The third correction section 82 uses the third output S3 for deciding an evaluation value as a function of the time t elapsed from the start of the calculation. The third evaluation signal F3 output by the third evaluation unit 8 represents this evaluation value.

The third output S3 is characterized in that its level is greater for higher sensor output wave amplitude during collision and longer collision duration, and its level increases with passage of time. Owing to these characteristics, the third output S3 is an excellent index for evaluating collision states which involve heavy deformation and allow detection of only low acceleration, as in vehicle-to-vehicle collisions.

Figure 8:
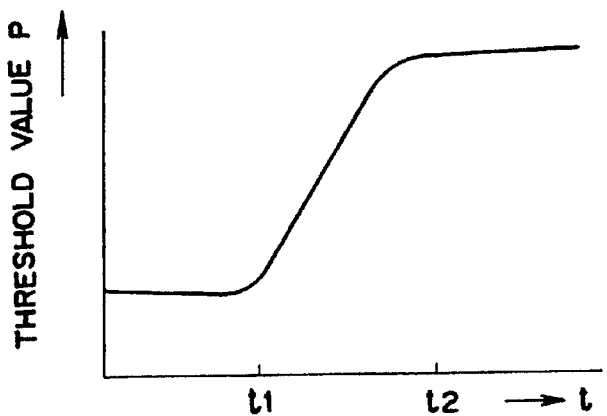
FIG. 8 is a characteristic curve of the correction in the third evaluation unit shown in FIG. 5.

FIG. 8 is the characteristic curve of a basic threshold value for evaluating the third output S3. Similarly to the characteristic curve of FIG. 7, it defines limit values for activating the air bag 4 determined by various tests and the like.

The third correction section 82 comprises a map calculation section 83 having a memory 84 for storing mapped data corresponding to the characteristic curve of FIG. 8. In response to the operation control signal CS, the map calculation section 83 carries out a map calculation for determining the threshold value P for the third output S3 at each instant of the elapsed time and outputs the result as a third threshold signal TH3. The third threshold signal TH3 and the third output S3 are sent to a third rate calculation section 85 which calculates the value S3/P. The third evaluation signal F3 output by the third evaluation unit 8 represents the result of this calculation.

Reference is again made to FIG. 2. The first to third evaluation signals F1 to F3 are sent to a decision unit 10 which decides whether or not a collision has occurred based on a comprehensive appraisal encompassing the vehicle speed change, the amount of passenger position change and the magnitude of the collision energy. When the decision unit 10 decides that a collision has occurred, it outputs the trigger signal TS.

Figure 9:
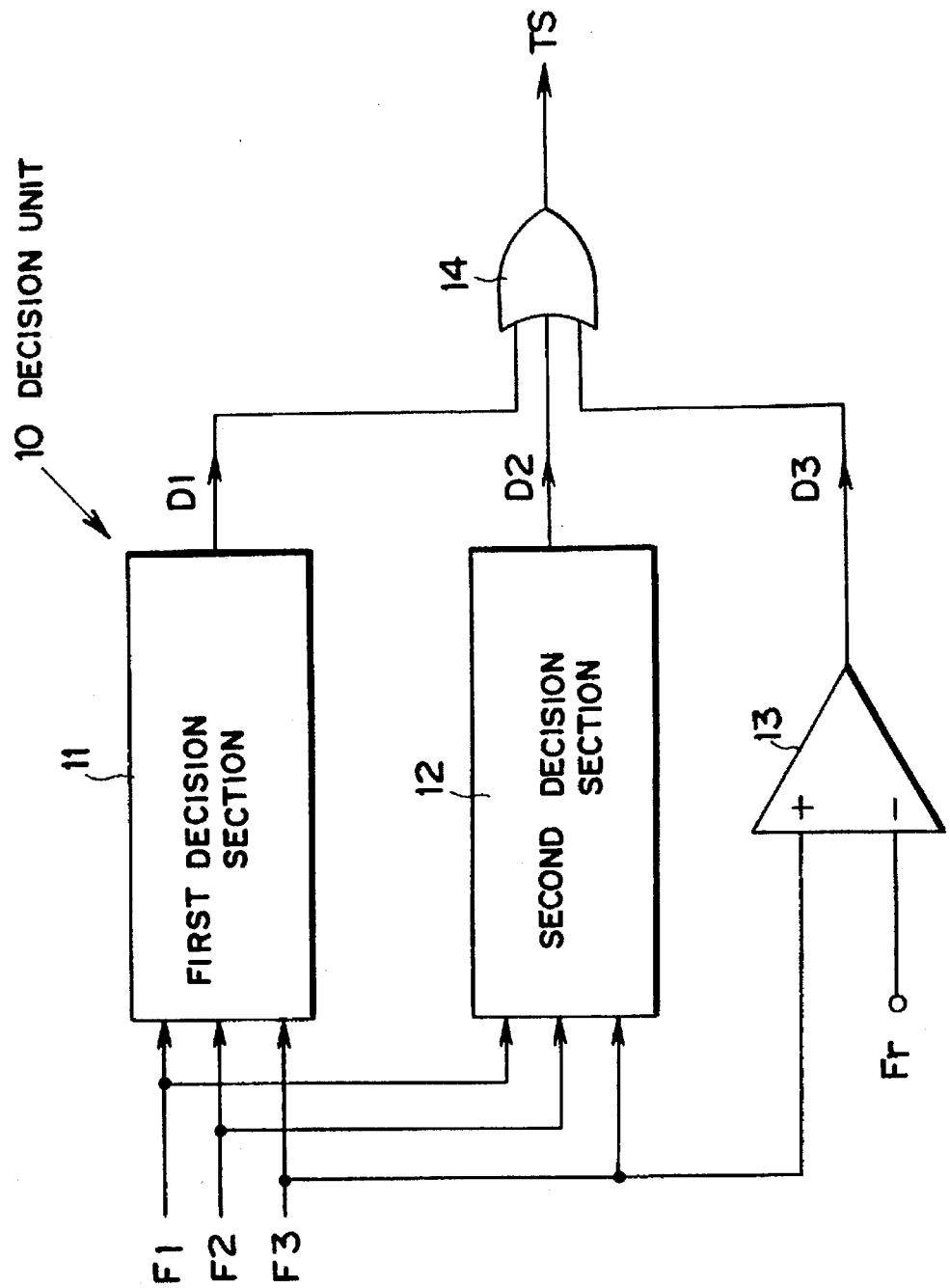
FIG. 9 is a block diagram of the decision unit shown in FIG. 2.

FIG. 9 is a block diagram showing the configuration of the decision unit 10. The first to third evaluation signals F1, F2, F3 sent to the decision unit 10 are received by a first decision section 11 and a second decision section 12. The first decision section 11 is responsive to these signals for deciding whether or not the system is in high-speed collision mode and outputs a first decision output D1 whose level is set to high when the result of the decision is affirmative and to low when it is negative. The second decision section 12 is responsive to the first to third evaluation signals F1, F2, F3 for deciding whether or not the information content of these signals is peculiar to the case of an oblique collision or a center pole collision and outputs a second decision output D2 whose level is set to high when the result of the decision is affirmative and to low when it is negative.

Figure 10:
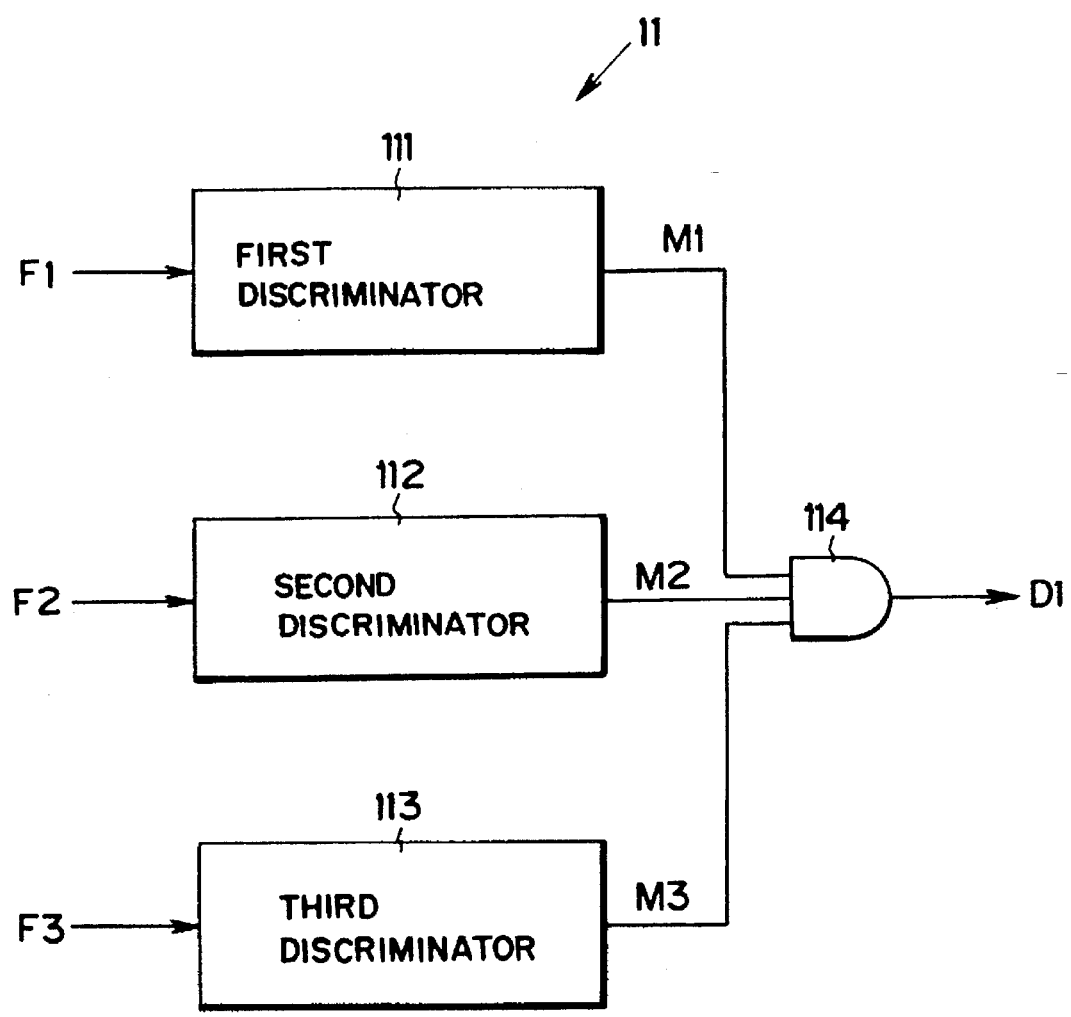
FIG. 10 is a block diagram of the first decision section shown in FIG. 9.

The configuration of the first decision section 11 is shown in FIG. 10. In the first decision section 11, the first evaluation signal F1 is received by a first discriminator 111 which discriminates whether or not the value thereof is unity (1) or greater and sets its output line M1 to high level only in the case that the value of first evaluation signal F1 is 1 or greater. The second evaluation signal F2 is received by a second discriminator 112 which discriminates whether or not the value thereof is 1 or greater and sets its output line M2 to high level only in the case that the value of the second evaluation signal F2 is 1 or greater. The third evaluation signal F3 is received by a third discriminator 113 which discriminates whether or not the value thereof is 1 or greater and sets its output line M3 to high level only in the case that the value of the third evaluation signal F3 is 1 or greater.

The output lines M1, M2, M3 are connected to different terminals of an AND gate 114 whose output is the output of the first decision section 11. Thus the output level of the AND gate 114 is high and a high-level first decision output D1 is obtained only when the values of the first to third evaluation signals F1, F2, F3 are all 1 or greater.

Figure 11:
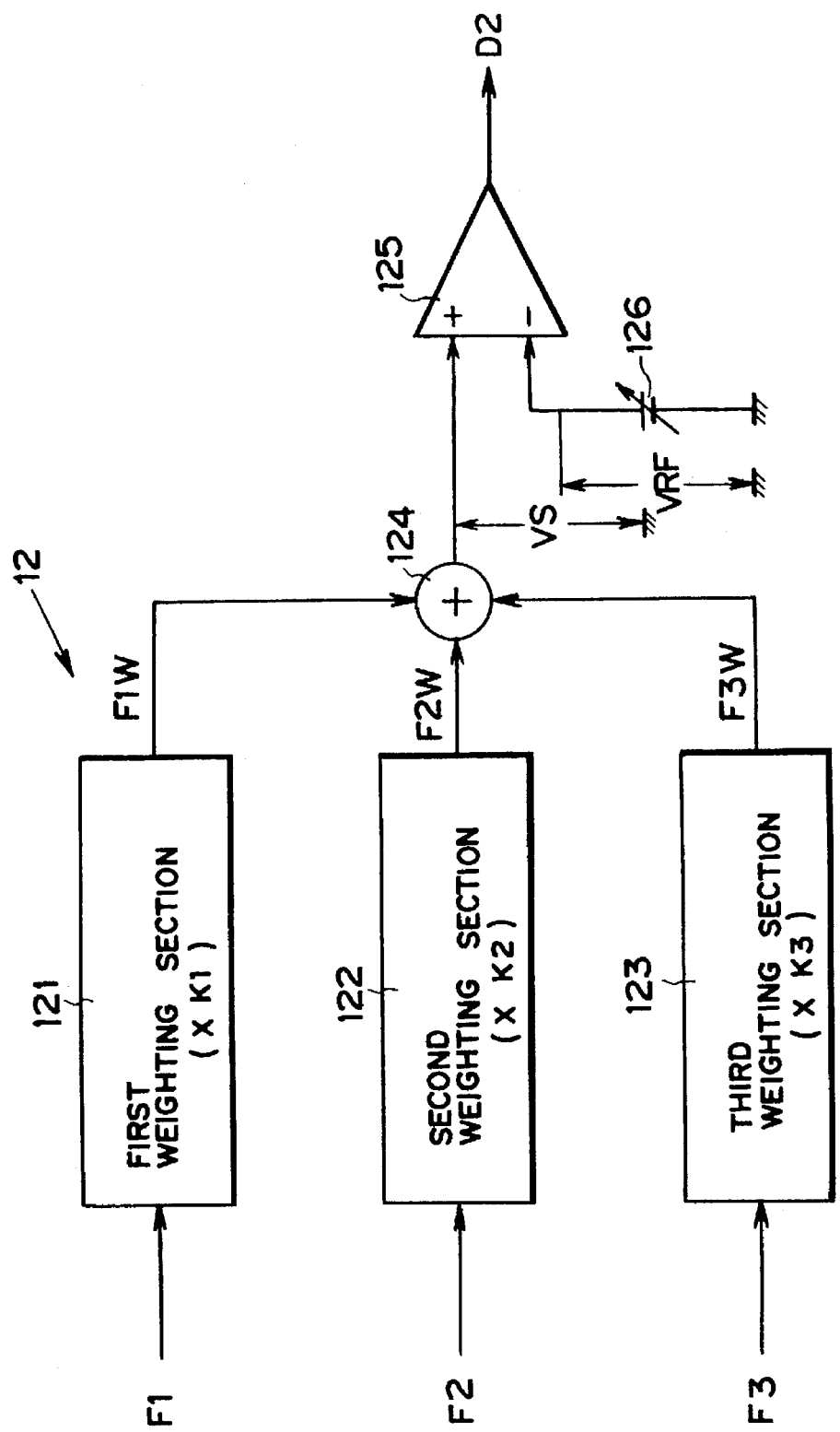
FIG. 11 is a block diagram of the second decision section shown in FIG. 9.

The configuration of the second decision section 12 is shown in FIG. 11. In the second decision section 12, the first evaluation signal F1 is received by a first weighting section 121 which multiplies it by a prescribed weighting coefficient K1 and outputs the result as first weighted evaluation signal F1W. The second evaluation signal F2 is received by a second weighting section 122 which multiplies it by a prescribed weighting coefficient K2 and outputs the result as a second weighted evaluation signal F2W. The third evaluation signal F3 is received by a third weighting section 123 which multiplies it by a prescribed weighting coefficient K3 and outputs the result as a third weighted evaluation signal F3W.

The weighting coefficients K1, K2, K3 are for weighting the evaluation signals F1, F2, F3 so as to facilitate detection of oblique and center pole collisions. Their values are determined based on the results of various collision tests.

The first to third weighted evaluation signals F1W, F2W, F3W are added in an adder 124 and a signal indicating their sum (voltage level VS) is compared with a prescribed reference voltage level VRF in a comparator 125. In the illustrated embodiment, the reference voltage level VRF produced by a reference voltage generator 126 is applied to the inverting input (−) terminal of the comparator 125 and the comparator 125 compares it with the voltage level VS (sum signal) applied to the non-inverting input (+) terminal thereof. If the voltage level VS equals or exceeds the reference voltage level VRF, the level of the comparator 125 output, which is the second decision output D2, becomes high.

Reference is again made to FIG. 9. The decision unit 10 is further provided with a level comparator 13 which compares the third evaluation signal F3 with a prescribed reference signal Fr for discriminating whether or not the vehicle collision energy is at or greater than a prescribed level. The reference signal Fr is produced by a reference voltage generator not shown in the drawings. If the collision energy is high so that the level of the third evaluation signal F3 exceeds the level of the reference signal Fr, the level comparator 13 produces a third decision output D3 of high level.

The first to third decision outputs D1, D2, D3 are input to an OR gate 14 whose output level becomes high when the level of any of these inputs is high and the output of the OR gate 14 is sent to the driving circuit 5 as the trigger signal TS.

In the so-configured system, the first to third evaluation units 6, 7, 8 use the acceleration information received from the acceleration sensor 2 to evaluate the vehicle speed change, the amount of passenger position change and the magnitude of the collision energy based on the square-law characteristics of the acceleration, produces first to third evaluation signals F1 to F3 indicating the results of the evaluations, and, as was explained in detail with reference to FIG. 9, makes a comprehensive appraisal from every angle as to whether or not a collision has occurred.

Specifically, the first decision section 11 decides that a high-speed collision has occurred when all of the first to third evaluation signals F1 to F3 are equal to or greater than 1, while for reliably discriminating oblique collisions and center pole collisions which are hard for the first decision section 11 to ascertain the second decision section 12 weights the first to third evaluation signals F1 to F3 and carries out a comprehensive evaluation encompassing all of the weighted values. In addition, by discriminating whether or not the collision energy exceeds a prescribed value based only on the third evaluation signal F3, the level comparator 13 decides whether or not a collision has occurred with reference solely to the magnitude of the collision energy.

As a result, the system can quickly and accurately discriminate collisions irrespective of type.

The controller 3 explained with reference to FIGS. 1 to 11 can be implemented by running a prescribed control program on a prior art microcomputer or the like.

Figure 12:
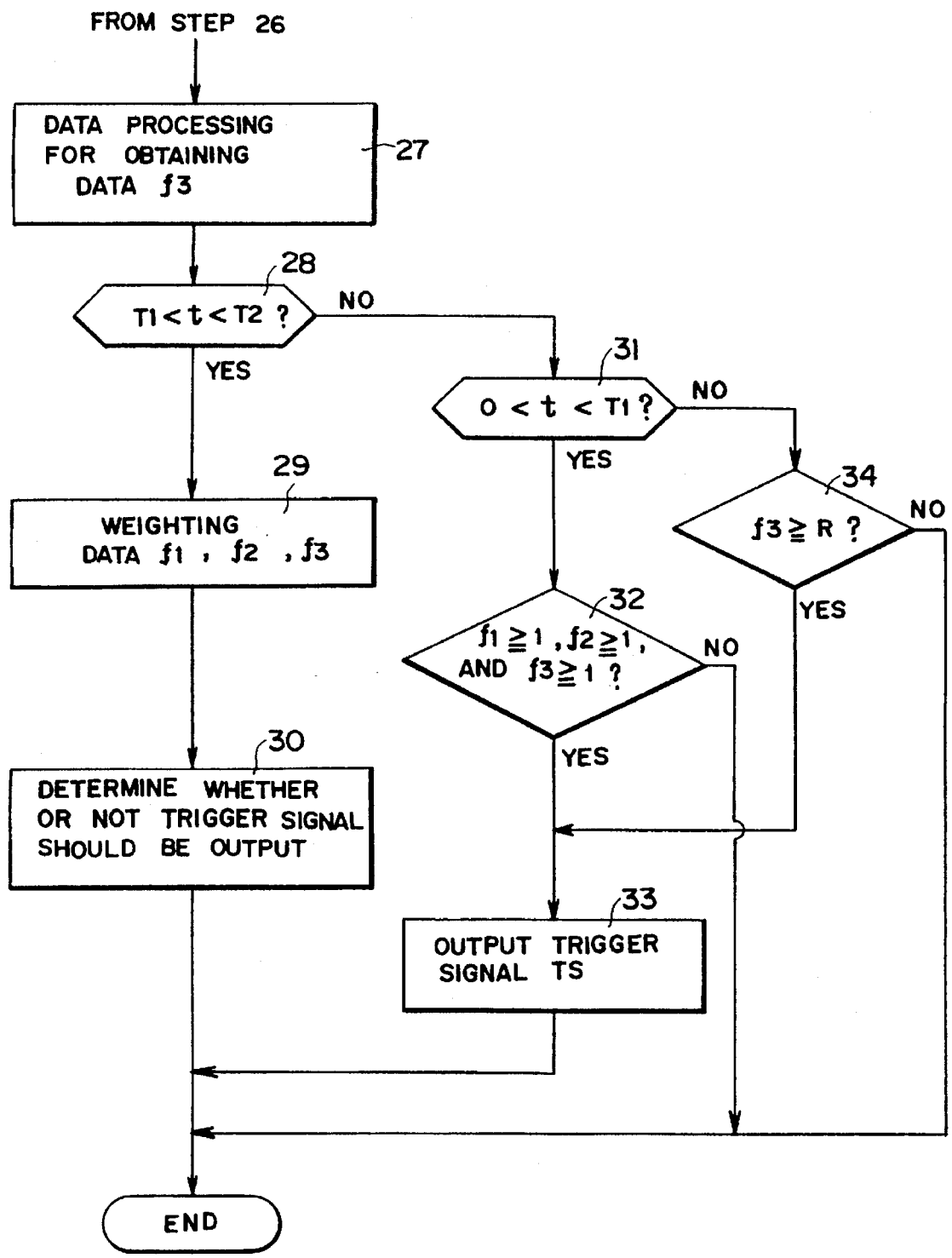
FIG. 12A is a flow chart showing the first part of a control program for operating a microcomputer to obtain functions similar to those of the controller shown in FIG. 2.
FIG. 12B is a flow chart showing the latter part of the control program for operating a microcomputer to obtain functions similar to those of the controller shown in FIG. 2.
Figure 12A:
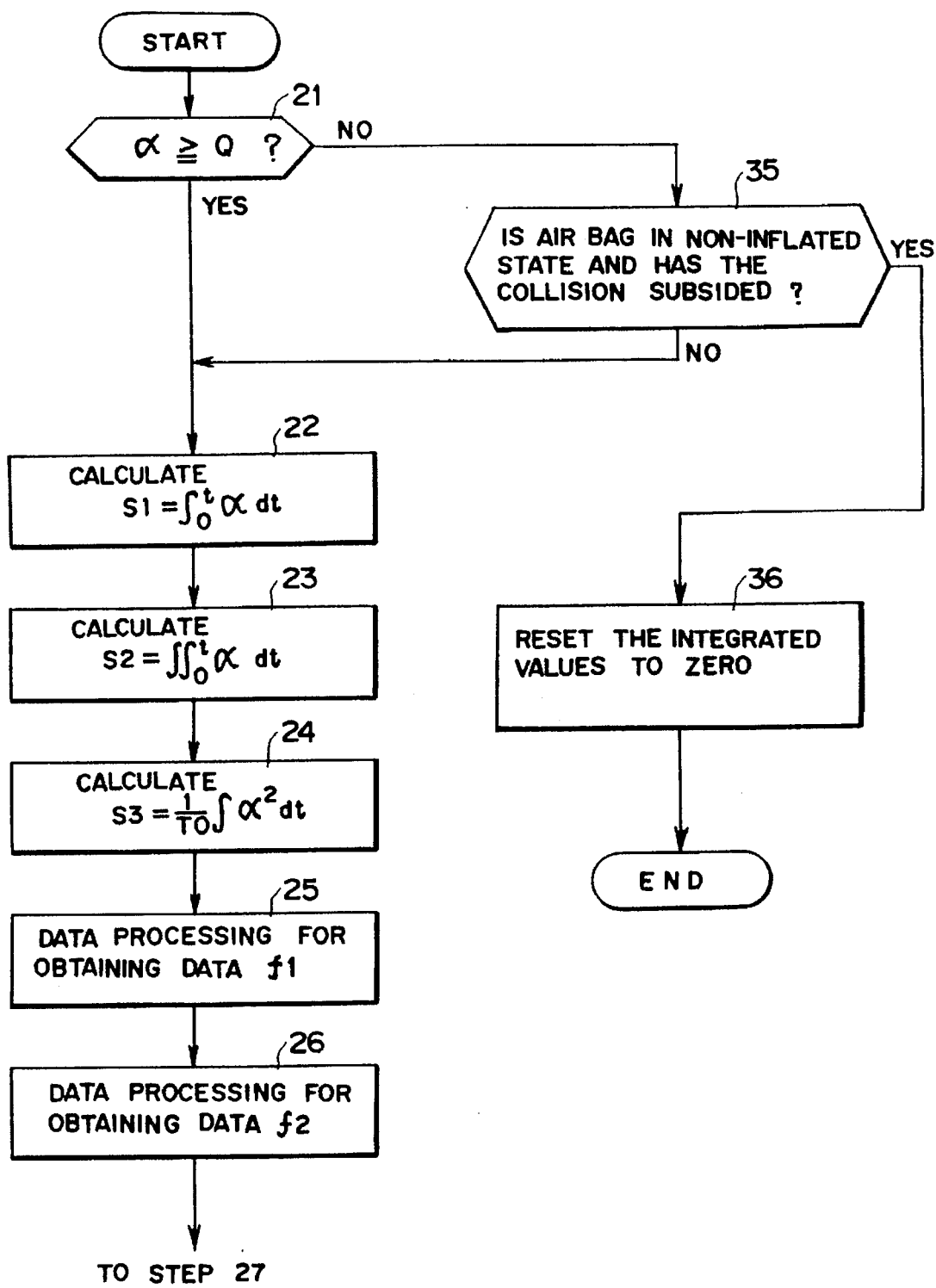

FIGS. 12A and 12B show a flow chart of one example of a control program for implementing the controller 3 by using a microcomputer to conduct collision discrimination processing and vehicle safety device activation control in accordance with the result.

After execution of the program has started, a check is made in Step 21 as to whether or not the acceleration α is equal to or larger than a prescribed acceleration value Q. If the result is YES, the same calculation as conducted in the first calculation section 61 is conducted in Step 22, the same calculation as conducted in the second calculation section 71 is conducted in Step 23, and the same calculation as conducted in the third calculation section 81 is conducted in S24.

Next, in Steps 25 to 27, the calculation results S1, S2, S3 obtained in Steps 22 to 24 are subjected to the same corrections as in the first to third correction sections 62, 72, 82 to obtain evaluation data f1, f2, f3 corresponding to the first to third evaluation signals F1, F2, F3.

After the first to third evaluation data f1, f2, f3 have been obtained in this manner, a check is made in Step 28 as to whether or not T1<t<T2, where T1 and T1 are respectively the fuzzy control start time and the fuzzy control terminate time and correspond to t1 and t2 in FIGS. 7 and 8. If the result in the Step 28 is YES, the first evaluation data f1, the second evaluation data f2 and the third evaluation data f3 are weighted in Step 29. These weighted evaluation data are then used in Step 30 for determining whether or not the squib 4A should be ignited. The processing in Steps 29 and 30 corresponds to the processing for discriminating low-speed collision conducted in the second decision section 12 of FIG. 11. If it is determined that the squib 4A should be ignited, Step 30 outputs the trigger signal TS and execution of the program is terminated.

If the result in Step 28 is NO, a check is made in Step 31 as to whether or not 0<t<T1. If the result in Step 31 is YES, a check is made in Step 32 as to whether the values of the first evaluation data f1, the second evaluation data f2 and the third evaluation data f3 are all 1 or greater. If the result in Step 32 is YES, the trigger signal TS is output in Step 33. If the result in Step 31 is NO, a check is made in Step 34 as to whether the third evaluation data f3 is equal to or greater than a prescribed value R and if it is, the trigger signal TS is output in Step 33. The discrimination made in Step 34 corresponds to that by the level comparator 13. The execution of the control program is terminated after the trigger signal TS is output in Step 33. If the result in Step 32 or 34 is NO, the execution of the program is terminated without executing Step 33.

On the other hand, if Step 21 finds that the acceleration α is not equal to or greater than the acceleration value Q, a discrimination is made in Step 35 as to whether or not the air bag 4 is in the non-inflated state and it can be considered that the collision has subsided. If the result in Step 35 is NO, Step 22 and the following steps are executed. If the result in Step 35 is YES, Step 36 resets the integrated values obtained in Steps 22 to 24 to zero and execution of the program is terminated.

What is claimed is:

1. A control system for controlling activation of a vehicle safety device in response to an acceleration signal from a detecting means for detecting vehicle acceleration, said system comprising:

first evaluation means for calculating from the acceleration signal a first evaluation value related to vehicle speed change, second evaluation means for calculating from the acceleration signal a second evaluation value related to passenger position change, third evaluation means for squaring the value of the acceleration signal and calculating from the squared value a third evaluation value related to collision energy magnitude, operation control means for starting and stopping the calculations in the first to third evaluation means in response to the acceleration signal, and decision means for deciding whether or not to activate the vehicle safety device in response to the first to third evaluation values calculated under the control of the operation control means, wherein the first evaluation means comprises a first calculation means responsive to the operation control means for integrating the acceleration signal and outputting the integrated value as a first output, and a first correction means for correcting the first output to obtain the first evaluation value indicating vehicle speed change, and wherein the first correction means comprises a first map calculation means responsive to the acceleration signal for calculating from a mad a threshold value for the first output at the current vehicle acceleration value, and a first rate calculation means for calculating the ratio of the first output to the threshold value calculated by the first map calculation means and for outputting the calculated ratio as the first evaluation value.

2. A control system as claimed in claim 1, wherein the second evaluation means comprises a second calculation means responsive to the operation control means for twice integrating the acceleration signal and outputting the integrated value as a second output and a second correction means for correcting the second output to obtain the second evaluation value indicating amount of passenger position change.

3. A control system as claimed in claim 2, wherein the second correction means comprises a second map calculation means responsive to the operation control means for calculating from a map a threshold value for the second output at each instant of time elapsed from the start of calculation in the second calculation means and a second rate calculation means for calculating the ratio of the second output to the threshold value calculated by the second map calculation means and outputting the calculated ratio as the second evaluation value.

4. A control system as claimed in claim 1, wherein the third evaluation means comprises a third calculation means responsive to the operation control means for integrating the square of the value of the acceleration signal and dividing the integrated value by a prescribed collision state duration value and outputting a result as a third output, and a third correction means for correcting the third output to obtain the third evaluation value indicating collision energy magnitude.

5. A control system as claimed in claim 4, wherein the third correction means comprises a third map calculation means responsive to the operation control means for calculating from a map a threshold value for the third output at each instant of time elapsed from the start of calculation in the third calculation means and a third rate calculation means for calculating the ratio of the third output to the threshold value calculated by the third map calculation means and outputting the calculated ratio as the third evaluation value.

6. A control system as claimed in claim 1, wherein the operation control means compares the level of the acceleration signal with a reference level and at the time the level of the acceleration signal exceeds the reference level sends to the first to third evaluation means a first operation control output commanding them to start calculation and at the time the level of the acceleration signal returns to the reference level sends to the first to third evaluation means a second operation control output commanding them to stop calculation.

7. A control system as claimed in claim 1, wherein the decision means is provided with a first collision decision means responsive to the first to third evaluation values for deciding whether or not a high-speed collision has occurred.

8. A control system as claimed in claim 7, wherein the first collision decision means is provided with means for discriminating whether or not each of the first to third evaluation values exceeds a prescribed value and outputs a signal for activating the vehicle safety device when it decides that all of the first to third evaluation values exceed the prescribed value.

9. A control system as claimed in claim 1, wherein the decision means is provided with a second collision decision means responsive to the first to third evaluation values for deciding whether or not an oblique collision or a center pole collision has occurred.

10. A control system as claimed in claim 9, wherein the second collision decision means is provided with weighting means for weighting each of the first to third evaluation values and means for obtaining the sum of the weighted evaluation values and outputs a signal for activating the vehicle safety device when it decides that the sum of the weighted evaluation values exceeds a prescribed value.

11. A control system as claimed in claim 1, wherein the decision means is provided with a third collision decision means for deciding based on the third evaluation value whether or not the collision energy is at or greater than a prescribed level.

12. A control system as claimed in claim 11, wherein the third collision decision means is provided with means for discriminating whether or not the third evaluation value is at or greater than a prescribed value and outputs a signal for activating the vehicle safety device when it decides that the third evaluation value is at or greater than the prescribed value.

13. A control system as claimed in claim 6, wherein the calculated values obtained in the first to third evaluation means are reset to zero in response to the second operation control output.

14. A control system for controlling activation of a vehicle safety device in response to an acceleration signal from a detecting means for detecting vehicle acceleration, said system comprising:

first evaluation means for calculating from the acceleration signal a first evaluation value related to vehicle speed change, second evaluation means for calculating from the acceleration signal a second evaluation value related to passenger position change, third evaluation means for squaring the value of the acceleration signal and calculating from the squared value a third evaluation value related to collision energy magnitude, operation control means for starting and stopping the calculations in the first to third evaluation means in response to the acceleration signal, and decision means for deciding whether or not to activate the vehicle safety device in response to the first to third evaluation values calculated under the control of the operation control means, wherein the second evaluation means comprises a second calculation means responsive to the operation control means for twice integrating the acceleration signal and outputting the integrated value as a second output, and a second correction means for correcting the second output to obtain the second evaluation value indicating amount of passenger position change, and wherein the second correction means comprises a second map calculation means responsive to the operation control means for calculating from a map a threshold value for the second output at each instant of time elapsed from the start of calculation in the second calculation means, and a second rate calculation means for calculating the ratio of the second output to the threshold value calculated by the second map calculation means and outputting the calculated ratio as the second evaluation value.

15. A control system for controlling activation of a vehicle safety device in response to an acceleration signal from a detecting means for detecting vehicle acceleration, said system comprising:

first evaluation means for calculating from the acceleration signal a first evaluation value related to vehicle speed change, second evaluation means for calculating from the acceleration signal a second evaluation value related to passenger position change, third evaluation means for squaring the value of the acceleration signal and calculating from the squared value a third evaluation value related to collision energy magnitude, operation control means for starting and stopping the calculations in the first to third evaluation means in response to the acceleration signal, and decision means for deciding whether or not to activate the vehicle safety device in response to the first to third evaluation values calculated under the control of the operation control means, wherein the third evaluation means comprises a third calculation means responsive to the operation control means for integrating the square of the value of the acceleration signal and dividing the integrated value by a prescribed collision state duration value and outputting a result as a third output, and a third correction means for correcting the third output to obtain the third evaluation value indicating collision energy magnitude.

16. A control system as claimed in claim 15, wherein the third correction means comprises a third map calculation means responsive to the operation control means for calculating from a map a threshold value for the third output at each instant of time elapsed from the start of calculation in the third calculation means, and a third rate calculation means for calculating the ratio of the third output to the threshold value calculated by the third map calculation means and outputting the calculated ratio as the third evaluation value.

17. A control system as claimed in claim 15, wherein the first evaluation means comprises a first calculation means responsive to the operation control means for integrating the acceleration signal and outputting the integrated value as a first output, and a first correction means for correcting the first output to obtain the first evaluation value indicating vehicle speed change, and wherein the second evaluation means comprises a second calculation means responsive to the operation control means for twice integrating the acceleration signal and outputting the integrated value as a second output, and a second correction means for correcting the second output to obtain the second evaluation value indicating amount of passenger position change.

18. A control system as claimed in claim 17, wherein the first correction means comprises a first map calculation means responsive to the acceleration signal for calculating from a first map a threshold value for the first output at the current vehicle acceleration value, and a first rate calculation means for calculating the ratio of the first output to the threshold value calculated by the first map calculation means and for outputting the calculated ratio as the first evaluation value, wherein the second correction means comprises a second map calculation means responsive to the operation control means for calculating from a second map a threshold value for the second output at each instant of time elapsed from the start of calculation in the second calculation means, and a second rate calculation means for calculating the ratio of the second output to the threshold value calculated by the second map calculation means and outputting the calculated ratio as the second evaluation value, and wherein the third correction means comprises a third map calculation means responsive to the operation control means for calculating from a third map a threshold value for the third output at each instant of time elapsed from the start of calculation in the third calculation means, and a third rate calculation means for calculating the ratio of the third output to the threshold value calculated by the third map calculation means and outputting the calculated ratio as the third evaluation value.

19. A control system for controlling activation of a vehicle safety device in response to an acceleration signal from a detecting means for detecting vehicle acceleration, said system comprising:

first evaluation means for calculating from the acceleration signal a first evaluation value related to vehicle speed change, second evaluation means for calculating from the acceleration signal a second evaluation value related to passenger position change, third evaluation means for squaring the value of the acceleration signal and calculating from the squared value a third evaluation value related to collision energy magnitude, operation control means for starting and stopping the calculations in the first to third evaluation means in response to the acceleration signal, and decision means for deciding whether or not to activate the vehicle safety device in response to the first to third evaluation values calculated under the control of the operation control means, wherein the decision means is provided with a second collision decision means responsive to the first to third evaluation values for deciding whether or not an oblique collision or a center pole collision has occurred, and wherein the second collision decision means is provided with weighting means for weighting each of the first to third evaluation values and means for obtaining the sum of the weighted evaluation values and outputting a signal for activating the vehicle safety device when it decides that the sum of the weighted evaluation values exceeds a prescribed value.

* * * * *